US008877091B2

(12) United States Patent
Yang et al.

(10) Patent No.: US 8,877,091 B2
(45) Date of Patent: Nov. 4, 2014

(54) NON-AQUEOUS LIQUID OXYGEN BLEACH COMPOSITION

(75) Inventors: Se In Yang, Seongman-si (KR); Kyung Keun Yoo, Seoul (KR); Yong Il Kim, Incheon (KR); Young Ran Lee, Incheon (KR)

(73) Assignee: D C Chemical Co., Ltd., Seoul (KR)

( * ) Notice: Subject to any disclaimer, the term of this patent is extended or adjusted under 35 U.S.C. 154(b) by 1318 days.

(21) Appl. No.: 11/993,622

(22) PCT Filed: Sep. 23, 2005

(86) PCT No.: PCT/KR2005/003162
§ 371 (c)(1), (2), (4) Date: Dec. 21, 2007

(87) PCT Pub. No.: WO2007/035009
PCT Pub. Date: Mar. 29, 2007

(65) Prior Publication Data

US 2010/0155659 A1 Jun. 24, 2010

(51) Int. Cl.

| | |
|---|---|
| ***A62D 3/00*** | (2006.01) |
| ***A62D 9/00*** | (2006.01) |
| ***C01B 15/00*** | (2006.01) |
| ***C01B 15/12*** | (2006.01) |
| ***C09K 3/00*** | (2006.01) |
| ***D06L 3/00*** | (2006.01) |
| ***D06L 3/02*** | (2006.01) |
| ***D06L 3/04*** | (2006.01) |
| ***C11D 3/02*** | (2006.01) |
| ***C11D 7/42*** | (2006.01) |
| ***C11D 17/00*** | (2006.01) |
| ***C11D 13/00*** | (2006.01) |
| ***C11D 3/00*** | (2006.01) |
| ***C11D 3/386*** | (2006.01) |
| ***C11D 7/00*** | (2006.01) |
| ***C11D 1/00*** | (2006.01) |
| ***C11D 10/00*** | (2006.01) |
| ***C11D 3/43*** | (2006.01) |
| ***D06L 1/04*** | (2006.01) |
| ***C11D 3/39*** | (2006.01) |
| ***C11D 1/83*** | (2006.01) |

(52) U.S. Cl.
CPC . *D06L 1/04* (2013.01); *D06L 3/025* (2013.01); *D06L 3/026* (2013.01); *C11D 17/0013* (2013.01); *C11D 3/43* (2013.01); *D06L 3/021* (2013.01); *C11D 3/3947* (2013.01); *C11D 1/83* (2013.01)
USPC ................ 252/186.3; 8/101; 8/111; 510/108; 510/392; 510/407; 510/418; 510/460; 510/488; 510/492; 510/505; 510/530; 510/535; 510/536

(58) Field of Classification Search
USPC ............ 8/101, 111; 252/186.3; 510/108, 392, 510/407, 418, 460, 488, 492, 505, 530, 535, 510/536
See application file for complete search history.

(56) References Cited

U.S. PATENT DOCUMENTS

| | | | | | |
|---|---|---|---|---|---|
| 2,798,053 | A * | 7/1957 | Brown | ............................ | 521/38 |
| 3,499,844 | A | 3/1970 | Kibbel, Jr. et al. | | |
| 3,630,929 | A * | 12/1971 | van Dijk | ...................... | 510/413 |
| 4,130,501 | A | 12/1978 | Lutz et al. | | |
| 4,900,468 | A | 2/1990 | Mitchell et al. | | |
| 4,950,424 | A * | 8/1990 | van der Hoeven et al. | ... | 510/413 |
| 5,011,622 | A * | 4/1991 | Schepers | ...................... | 510/371 |
| 5,880,076 | A * | 3/1999 | Vermeer | ...................... | 510/123 |
| 5,929,012 | A | 7/1999 | Del Duca et al. | | |
| 6,207,634 | B1 * | 3/2001 | Meyer et al. | .................. | 510/371 |
| 6,235,699 | B1 | 5/2001 | Del Duca et al. | | |
| 6,384,008 | B1 * | 5/2002 | Parry | ............................ | 510/414 |
| 2002/0022693 | A1 * | 2/2002 | Luginsland | .................. | 525/100 |

FOREIGN PATENT DOCUMENTS

| | | | | | |
|---|---|---|---|---|---|
| EP | 0266199 | * | 5/1988 | ............... | C11D 1/72 |
| GB | 2 229 460 | A | 9/1990 | | |
| JP | 09-183998 | | 7/1997 | | |
| JP | 2000-273500 | * | 10/2000 | ............. | C11D 17/08 |
| WO | WO 91/12312 | * | 8/1991 | ............. | C11D 17/00 |
| WO | WO 98/00517 | | 1/1998 | | |
| WO | WO 00/71658 | * | 11/2000 | ............... | C11D 3/37 |

OTHER PUBLICATIONS

Real Dictionary {Maintain entry, Princeton University Princeton NJ USA 2000 Available May 26, 2003 {http://www.realdictionary.com/?q=maintain}.*
English German Dictionary printed Sep. 4, 2014 {http://www.dictionary-english-german.com/en/dictionary-english-german/stabilizer} (C) 1.*
Interglot ("in control" entry (C) 2000-2014, taken as Dec. 2000) {http://www.interglot.com/dictionary/en/en/translate/in%20control?l=en%7Cen}).*

* cited by examiner

*Primary Examiner* — Patrick Ryan
*Assistant Examiner* — Aaron Greso
(74) *Attorney, Agent, or Firm* — Frommer Lawrence & Haug LLP; Ronald R. Santucci

(57) ABSTRACT

This invention relates to a novel non-aqueous liquid oxygen bleach composition prepared by dispersing solid peroxygen compound in the liquid in which the content of an anhydrous non-polar organic solvent and a non-ionic and anionic surfactant is controlled. The composition is formed in a high viscous paste or a gel-type suspension and can be used as a multi-purpose composition, for example, the bleach and stain remover of clothes and the cleanser of bathroom and kitchen since they have a chemical/physical stability of no loss of available oxygen, an excellent bleaching and cleaning ability due to their alkaline pH range, no change of viscosity or no phase separation during the storage and so on.

18 Claims, No Drawings

NON-AQUEOUS LIQUID OXYGEN BLEACH COMPOSITION

This application is a 371 of PCT/KR2005/003162 filed on Sep. 23, 2005, published on Mar. 29, 2007 under publication number WO 2007/035009 A1.

TECHNICAL FIELD

The present invention relates to a non-aqueous liquid oxygen bleach composition. More particularly, the present invention relates to a non-aqueous liquid oxygen bleach composition, having advantages that it has high bleaching and cleaning abilities due to its alkaline pH range and there is no substantial loss of available oxygen, no change of viscosity and no phase separation during the storage thereof due to their excellent chemical and physical stabilities. The composition of the present invention may be used for a bleach, a stain remover for clothes and a cleanser for bathroom and kitchen.

BACKGROUND ART

The currently available commercial bleaches are mainly divided into chlorine bleaches and oxygen bleaches.

In GB Patent No. 2,229,460, a chlorine bleach comprising sodium hypochlorite as a main ingredient is disclosed. The chlorine bleach has a strong bleaching ability, but it has drawbacks that it discolors colored clothes and destroys a textile structure. Further, it has a defect of generating an unpleasant odor due to the presence of chlorine which is known harmful to human body.

Accordingly, the use of oxygen bleaches without the aforementioned drawbacks of the chlorine bleaches has been on the growing increase in recent years. The oxygen bleaches are divided into liquid bleaches and powder bleaches according to its form.

Most of the oxygen bleaches at current markets are powder bleaches which use sodium carbonate peroxyhydrate or sodium perborate, but they have a drawback that they are hardly soluble in water at room temperature, especially in cold water. Further, they are hardly miscible with each solid ingredient homogeneously in the preparation of the powder bleach and also generate dust and are unable to perform partial bleachings on stains.

Therefore, consumers prefer a liquid bleach to powder one due to the convenience to use. For liquid bleach, there are several advantages such as easy weighing, quick dissolving in water, no dust generation and no caking which incurs often in powder bleach during storage.

In U.S. Pat. Nos. 6,235,699, 5,929,012, and 4,900, 468, the liquid bleaches using hydrogen peroxide are disclosed. The liquid bleaches using hydrogen peroxide have some problems such as container expansion and bleaching ability decrease due to the decomposition of hydrogen peroxide during the storage thereof. In addition, it is necessary to keep the pH thereof acidic to stabilize hydrogen peroxide, but bleaching and cleaning ability show a substantial decrease in a low pH condition.

In U.S. Pat. Nos. 3,499,844 and 4,130,501, the method to increase the viscosity of the cleaning composition for improving the chemical stability of the liquid bleach is disclosed. However, the method has some problems that the bleaching and cleaning ability decrease substantially under the acidic pH and the viscosity of the composition changes due to the decomposition of hydrogen peroxide during the storage, which makes its commercialization difficult.

DISCLOSURE OF INVENTION

Technical-Problem

Accordingly, an object of the present invention is to provide a non-aqueous liquid oxygen bleach composition, formed as a paste or a gel-type suspension.

Another object of the present invention is to provide a non-aqueous liquid oxygen bleach composition, prepared by dispersing a solid peroxygen compound with certain range of particle sizes into a liquid containing anhydrous non-polar water-miscible organic solvent, and surfactant where type/content of the surfactant is carefully controlled.

Further another object of the present invention is to provide a non-aqueous liquid bleach composition having a high chemical stability with low loss of available oxygen and a high physical stability with no change of viscosity and no liquid-solid phase separation.

Technical-Solution

To achieve at least the objects above and other advantages of the present invention, there is provided a non-aqueous liquid oxygen bleach composition including 0.1 to 85 wt % of a solid peroxygen compound, 10 to 80 wt % of a non-aqueous organic solvent, 0.1 to 10 wt % of anionic surfactant, 0.1 to 10 wt % of non-ionic surfactant, and 0.01 to 15 wt % of a stabilizer, wherein the bleach composition is a suspension composition with a viscosity ranging from 500 to 5,000,000 cps (25 degrees C.).

Further, there is provided a novel non-aqueous liquid bleach composition, in a form of high viscous paste or gel-type suspension, prepared by dispersing a solid peroxygen compound into a liquid in which the content of an anhydrous non-polar organic solvent, a non-ionic and an anionic surfactant is controlled.

Advantageous Effects

The novel non-aqueous liquid bleach composition provides at least the following advantages.

First, the non-aqueous liquid bleach composition can be used for a bleach, a stain remover for removing a stain on clothes and a cleanser for cleaning a bathroom and a kitchen.

Second, the non-aqueous liquid bleach composition according to this invention has chemical and physical stabilities of no loss of available oxygen, an excellent bleaching and cleaning ability due to its alkaline pH range, no change of viscosity or no phase separation during the storage thereof and so on.

Finally, a non-aqueous liquid bleach composition is in the alkaline condition which enhances bleaching and cleaning ability.

Best Mode

Hereinafter, the best mode of the present invention will be described in detail.

A non-aqueous liquid oxygen bleach composition in accordance with the present invention comprises a solid peroxygen compound, a non-aqueous organic solvent, an anionic surfactant, a non-ionic surfactant, a stabilizer. The non-aqueous liquid oxygen bleach composition may additionally comprise a thickening agent, a filler, a fluorescent whitening agent, enzyme and perfume.

The solid peroxygen compound used in the present invent ion can be selected from the group consisting of percarbonate, perborate, persulfate, urea peroxide and metal peroxygen compounds $ZnO_2$, $MnO_2$, and $CaO_2$ which can generate hydrogen peroxide, but among such compounds, percarbonate is the most preferable solid peroxygen compound. The percarbonate prepared by synthesizing sodium carbonate and hydrogen peroxide is an environment-friendly compound with high content of available oxygen and high solubility in water. It is preferable to use the peroxygen compound having an average particle size in the range of 1 to 700 micrometers. The large-size particle is helpful to increase the content of peroxygen compound, but too large size is not desirable in an aspect of the solubility in water because solubility thereof decreases. The use of the solid peroxygen compound is in the range of 0.1 to 85 wt %, preferably in the range of 1 to 75 wt %. If it is used less than 0.1 wt %, it becomes not effective as the bleach. If it is used more than 85 wt %, the physical stability of the composition is lowered.

Further, the non-aqueous organic solvent should be very carefully selected because it highly affects the whole chemical/physical stability of the composition. Accordingly, the selection of the non-aqueous organic solvent is one of the important characteristics of the present invention.

The non-aqueous solvent was typically selected from water-miscible organics in related arts but peroxygen compound (especially percarbonate) negatively affects the chemical stability of composition if it is dissolved in water. Therefore, the non-aqueous organic solvent in the present invention is selected from among anhydrous (less than 0.5 wt % of water) and non-hygroscopic solvents.

Also, it is preferable that the solvent of the present invention has a low polarity. The solvent having a high polarity, such as ethanol and propanol, is not preferred because it dissolves peroxygen compound such as percarbonate. And, it is preferable that the non-aqueous organic solvent used in the present invention has a property of not reacting with other ingredients used in this invention.

The non-aqueous organic solvent satisfying the condition is one or a mixture composed of ones selected from the group consisting of polyalkyleneglycol, polyhydricalcohol, alkyleneglycol monoalkylether, alkylester and alkylamide.

The organic solvent having a low molecular weight and a low polarity is preferable. For example, polyethylene glycol (200 to 600 of molecular weight), glycerol, methyl ester, methyl amide and methyl acetate are preferable organic solvents. The alkyleneglycol monoalkylether is mono-, di-, tri- or tetra-alkyleneglycol monoalkylether, alkylene is $C_2$ to $C_3$ and alkyl is $C_2$ to $C_6$. The use of the non-aqueous organic solvent is 10 to 80 wt %, preferably 20 to 60 wt %. If it is used less than 10 wt % or exceeds 80 wt %, the physical stability of it is lowered.

For surfactant, both of anionic and non-ionic surfactants can be used in the present invention.

The anionic surfactant is selected from the group consisting of linear alkylbenzene sulfonate indicated as formula 1, fatty acid salt indicated as formula 2, linear alkyl sulfonate indicated as formula 3 and alpha olefin sulfonate indicated as formula 4 or a mixture thereof.

$R^1—C_6H_4—SO_3X$ (Formula 1)

$R^2—CH_2—COOX$ (Formula 2)

$R^3—CH_2—SO_3X$ (Formula 3)

$R^3—CH{=}CHCH_2—SO_3X$ (Formula 4)

In formulas 1 to 4, $R^1$ is an alkyl chain of $C_9$ to $C_{15}$, $R^2$ is an alkyl chain of $C_{11}$ to $C_{16}$, $R^3$ is an alkyl chain of $C_{11}$ to $C_{18}$ and X is an alkaline metal.

The use of the anionic surfactant is 0.1 to 10 wt %, preferably 0.5 to 5 wt %. If it is used less than 0.1 wt %, it becomes not effective in cleaning. If it is used more than 10 wt %, it lowers the physical stability of the composition.

The non-ionic surfactant selected from the group consisting of fatty acid alcohol polyoxyethyleneglycol indicated as formula 5, fatty acid polyoxyethyleneglycol indicated as formula 6 and alkylphenyl polyoxyethyleneglycol indicated as formula 7 and a mixture thereof.

$R^4—CH_2—(OCH_2CH_2)_n—OH$ (Formula 5)

$R^4—CO—(OCH_2CH_2)_n—OH$ (Formula 6)

$R^4—C_6H_4—(OCH_2CH_2)_n—OH$ (Formula 7)

In formulas 5 to 7, n is a positive integer in the range of 5 to 25 and $R^4$ is an alkyl chain of $C_{11}$ to $C_{18}$.

The use of the non-ionic surfactant is 0.1 to 10 wt %, preferably 0.5 to 5 wt %. If it is used less than 0.1 wt %, it becomes not effective in cleaning. If it is used more than 10 wt %, it lowers the physical stability of the composition.

Further, it is very important to define the use and the ratio of the anionic and non-ionic surfactant since they affect the chemical/physical stability of the composition.

The weight ratio of anionic and non-ionic surfactant is 3:1 to 1:3 in the non-aqueous liquid oxygen bleach composition of the present invention. If the ratio of the surfactant is out of the range, the physical stability of the composition will be lowered. The use of the surfactant is 0.2 to 20 wt %, preferably 1 to 10 wt %.

The stabilizer may be a rheological stabilizer, a peroxide stabilizer, and a mixture thereof. More particularly, the stabilizer may be 0.01 to 10 wt % of a peroxide stabilizer, 0.01 to 5 wt % of a rheological stabilizer, or a mixture of 0.01 to 10 wt % of a peroxide stabilizer and 0.01 to 5 wt % of a rheological stabilizer.

The peroxygen compound stabilizer (a chelating agent) includes at least one compound selected from the group consisting of organic acid, salt of organic acid and amino polyphosphonate compound. The organic acid can be selected from the group consisting of citric acid, dipicolinic acid and gluconic acid. The amino polyphosphonate compound can be selected from the group consisting of hydroxy ethylene diphosphonate, ethylene diamine tetra(methylene phosphonate), diethylene triamine penta(methylene phosphonate) and amino tri(methylene phosphonate). Especially, anhydrous stabilizer is more effective. The use of the stabilizer is 0.01 to 10 wt %, preferably 0.1 to 5 wt %. If it is used less than 0.01 wt %, the chemical stability of the composition is lowered. If it is used more than 5 wt %, there is no improvement in its chemical stability. The currently marketed stabilizer is Dequest™ series of Solutia Co.

The rheological stabilizer is used to maintain the viscosity of the paste or the gel-type suspension composition during the storage. The rheological stabilizer can be selected from the group consisting of benzoic acid, derivative of benzoic acid and aromatic compound (currently marketed OXYRITE100™ of Noveon Co.). The use of the rheological stabilizer is 0.01 to 5 wt %, preferably 0.1 to 3 wt %.

The thickening agent is used to prepare the suspension having high physical stability. The thickening agent is selected from the group consisting of fatty acid, cross-linked acrylic acid copolymer, colloidal silica, carboxymethylcellulose, polyvinyl alcohol, polyvinyl pyrrolidone and sodium polyacrylate and a mixture thereof.

The fatty acid is a mixture of at least two acids selected from saturated or un-saturated fatty acids having 10 to 18 of carbon number. Preferably, the mixture is composed of at least two acids selected from capric acid, lauric acid, myristic acid and palmitic acid. The use of the fatty acid is 0.01 to 5 wt %, preferably 0.1 to 1.5 wt %.

The acrylic acid copolymer cross-linked with 0.75 to 1.5% of polyallylsucrose can be used as the cross-linked acrylic acid copolymer. The use of the cross-linked acrylic acid copolymer is 0.01 to 1.5 wt %, preferably 0.2 to 1 wt %.

The hydrophilic fumed silica having 200 □/g of surface area and 10 to 12□ of an average particle size or the hydrophobic fumed silica having 100 □/g of surface area and 10 to 20□ of an average particle size can be used as colloidal silica. The use of the colloidal silica is 0.01 to 5 wt %, preferably 1 to 3 wt %. The currently marketed thickening agent is 'Carbopol 676, 934, 937, 940, 941' of Noveon Co., 'Aerosil 200' of Degussa Co. and 'Cabosil fumed silica' of Cabot Co.

The non-aqueous liquid oxygen bleach composition of the present invention is formed in a chemically stable suspension without filler, but the filler acting as a builder and a moisture-absorbent can be used. The filler is selected from the group consisting of sodium carbonate ($Na_2CO_3$), sodium bicarbonate ($NaHCO_3$) and sodium sulfate ($Na_2SO_4$) and a mixture thereof. The use of the filler is 0.1 to 85 wt %, preferably 0.5 to 70 wt %. If it is used less than 0.1 wt %, the chemical stability of the composition is lowered. If it is used more than 8.5 wt %, the physical stability of the composition is lowered.

Metal (for example, Fe, Mn, Cu and Cr) which may be contained in an ingredient of the composition or introduced during the preparation of the composition is not preferred because it promotes the decomposition of the peroxygen compound and then lowers the chemical stability of the composition. Small amount of various ingredients such as an antioxidant, a color agent, a fluorescent whitening agent, an anti-precipitant, a cleaning enzyme and perfume which are typically used in the art can be included in the composition. The total use of the small amount of ingredients is 0.01 to 2 wt %.

As described above, the non-aqueous liquid oxygen bleach composition of the present invention are formed in a paste or a gel-type non-aqueous suspension having 500 to 5,000,000 cps (21/sec of shear rate, at 25° C.) of viscosity and comprise peroxygen compound generating hydrogen peroxide, a water-miscible organic solvent, a surfactant, peroxygen compound stabilizer (a chelating agent), rheological stabilizer, a thickening agent and a filler, and can further comprise a small amount of fluorescent whitening agent, enzyme and perfume as an additive. Further, the moisture content of the composition is less than 1.0 wt %, preferably less than 0.5 wt %. The composition can be used as multi-purpose bleaches since they are chemically/physically stable during the storage, easy to use, available for cleaning and removing stain without causing any damage to clothes and sterilizing and cleaning of kitchen, bathroom and vent.

EXAMPLES

This invention is explained in more detail based on the following Examples but they should not be construed as limiting the scope of this invention.

Examples 1 to 14 and Comparative Examples 1 to 6

In order to prepare a bleach composition, an organic solvent and a non-ionic surfactant are fed into a 1 L glass reactor having a three-blade propeller agitator and a cooling jacket and stirred by the agitator. A thickening agent, an anionic surfactant, a peroxygen compound stabilizer, a rheological stabilizer and a fluorescent whitening agent are added to the mixture of the organic solvent and the non-ionic surfactant while the mixture is agitated at a rate of greater than 600 rpm to be dissolved. After 1 hour of agitation, the filler is added to the mixture. At this time, peroxygen stabilizer may not be dissolved depending on its kinds.

After 10 minutes of agitation, powder-type peroxygen compound and enzyme are added to the mixture slowly. Then, the mixture is further agitated for 30 minutes to 1 hour. In the case of having a difficulty in agitation due to bubble formation, agitating of the mixture is performed under the vacuum to remove the bubbles. If the temperature inside the reactor is above 35° C., the cooling jacket is used to cool down the system. If necessary, the perfume can be added after these steps.

The ingredients and use used in examples 1 to 7 and comparative examples 1 to 3 are listed in Table 1, and those of example 8 to 14 and comparative example 4 to 6 are shown in Table 2.

Experimental Example 1

Measurement of Chemical and Physical Stabilities (Measurement of Chemical Stability)

The bleach compositions prepared according to examples 1 to 14 and comparative examples 1 to 6 are stored at 50° C. for 1 month. Then, the loss of available oxygen is calculated by the titration method using $KMnO_4$ and the resulting chemical stability is shown in Tables 1 and 2. It is determined to be stable if the loss of available oxygen is less than 10% (stability is more than 90%).

(Measurement of Physical Stability)

The bleach compositions prepared according to examples 1 to 14 and comparative examples 1 to 6 are fed into a 100 mL graduated cylinder and stored at room temperature for 1 month. Then, the phase separation is measured. In addition, the bleach composition is stored at freeze-thaw cycles (−4° C./40° C.). for 1 month. Then, the phase separation is measured and the results are shown in Table 1 and Table 2.

What a chemical composition is physically stable means there is no phase separation in the chemical composition. In the 100 mL graduated cylinder, supernatant of the bleach compositions, generated by phase separation, is measured by reading the graduation of the cylinder, and the results are shown in Table 1 and Table 2. In the tables, as the value of the supernatant becomes lower, it becomes physically more stable.

TABLE 1

| | Use (wt %) | | | | | | | | | |
|---|---|---|---|---|---|---|---|---|---|---|
| | Example | | | | | | | Comparative Example | | |
| Ingredient | 1 | 2 | 3 | 4 | 5 | 6 | 7 | 1 | 2 | 3 |
| Sodium lauryl sulfate | 1.0 | 2.0 | 2.0 | 2.0 | 2.0 | 2.0 | 2.0 | 1.0 | 1.0 | 2.0 |
| C12EO(9)ethoxylated alcohol | 0.5 | 3.0 | 3.0 | 3.0 | 3.0 | 3.0 | 3.0 | 0.5 | 0.5 | 3.0 |

TABLE 1-continued

| Ingredient | Use (wt %) Example 1 | 2 | 3 | 4 | 5 | 6 | 7 | Comparative Example 1 | 2 | 3 |
|---|---|---|---|---|---|---|---|---|---|---|
| Sodium carbonate | — | 4.0 | 4.0 | 4.0 | 4.0 | 30 | 4.0 | — | — | 4.0 |
| Sodium sulfate | — | 1.0 | 1.0 | 1.0 | 1.0 | 30 | 1.0 | — | — | 1.0 |
| Sodium percarbonate[1] | 59 | 62.4 | 62.5 | 63.1 | 73[2] | 3.0 | — | 59 | 59 | 61.4 |
| Sodium perborate[3] | — | — | — | — | — | — | 63.1 | — | — | — |
| TAED[4] | — | — | — | — | — | — | — | — | — | 1.0 |
| D2016D[5] | 0.1 | 0.5 | 0.5 | 0.5 | 0.5 | 1.0 | 0.5 | 0.1 | 0.1 | 0.5 |
| Sodium gluconate | — | 0.5 | 0.5 | 0.5 | 0.5 | — | 0.5 | — | — | 0.5 |
| Lauric acid | 1.0 | 0.5 | — | — | 0.5 | 0.5 | — | 1.0 | 1.0 | 0.5 |
| Myristic acid | 0.4 | 0.2 | — | — | 0.2 | 0.2 | — | 0.4 | 0.4 | 0.2 |
| Carbomer[6] | — | — | 0.6 | — | — | — | — | — | — | — |
| PEG400[7] | 38 | 25 | 25 | 25 | 14.4 | 29.4 | 25 | — | 19 | 25 |
| PEG200 | — | — | — | — | — | — | — | 38 | — | — |
| Ethanol (anhydrous) | — | — | — | — | — | — | — | — | 19 | — |
| Fluorescent whitening agent[8] | — | 0.3 | 0.3 | 0.3 | 0.3 | 0.3 | 0.3 | — | — | 0.3 |
| Enzyme[9] | — | 0.5 | 0.5 | 0.5 | 0.5 | 0.5 | 0.5 | — | — | 0.5 |
| Perfume | — | 0.1 | 0.1 | 0.1 | 0.1 | 0.1 | 0.1 | — | — | 0.1 |
| Physical Stability | | | | | | | | | | |
| Room temperature, 1 month | 2 ml | 1 ml | 1 ml | 1 ml | 1 ml | 1 ml | 2 ml | 15 ml | 20 ml | Decomposition |
| Freeze-thaw cycle (−4 to 40° C.), 1 month | 2 ml | 1 ml | 1 ml | 1 ml | 1 ml | 1 ml | 2 ml | 10 ml | 15 ml | Decomposition |
| Chemical Stability | | | | | | | | | | |
| 50° C., 1 month | 92% | 95% | 95% | 95% | 97% | 93% | 97% | 80% | 85% | 73% |

1) sodium percarbonate, average particle size = 70 μm
2) sodium percarbonate, average particle size = 620 μm
3) sodium perborate, average particle size = 150 μm
4) TAED: Mikon ATC-Green, Warwick Co.
5) D2016D: Solutia Co.
6) Carbomer: Carbopol 676, Noveon Co.
7) PEG400: polyethylene glycol, molecular weight = 400
8) AMS-GX, Ciba Specialty Co.
9) Everlase 6.0T, Novozymes Co.

As shown in Table 1, the composition of comparative example 1 using PEG200 as a solvent show phase separation and low chemical stability by large loss of available oxygen compared to the composition of example 1 using PEG400 as a solvent. Further, the composition of comparative example 2 using PEG400 and anhydrous ethanol as a solvent also shows poor physical and chemical stabilities.

The composition of example 2 using sodium carbonate and sodium sulfate as a filter shows excellent chemical stability and bleaching ability compared to the composition of example 1. The composition of example 3 using Carbomer as a thickening agent shows excellent stability, and the compositions of example 4 to example 7 without using a thickening agent shows good physical and chemical stabilities as good as the compositions of examples 1 to example 3 and example 5 to example 6. Meanwhile, the composition of comparative example 3 using a bleach activator has strong bleaching ability but shows poor chemical stability.

The composition of example 5 with using sodium percarbonate having an average particle size of 620 micrometers and the composition of example 6 with using 3 wt % of sodium percarbonate and 60 wt % of filler (sodium carbonate and sodium sulfate) show good physical and chemical stabilities. The composition of example 7 with using sodium perborate as a peroxygen compound also shows good physical and chemical stabilities.

TABLE 2

| Ingredient | Use (wt %) Example 8 | 9 | 10 | 11 | 12 | 13 | 14 | Comparative Example 4 | 5 | 6 |
|---|---|---|---|---|---|---|---|---|---|---|
| Sodium lauryl sulfate | 1.0 | 2.0 | 2.0 | 2.0 | 2.0 | 2.0 | 2.0 | 2.0 | 2.0 | 2.0 |
| $C_{12}$EO(9)ethoxylated alcohol | 0.5 | 3.0 | 3.0 | 3.0 | 3.0 | 3.0 | 3.0 | 3.0 | 3.0 | 3.0 |
| Sodium carbonate | — | — | — | — | — | 30 | — | — | — | — |
| Sodium sulfate | — | — | — | — | — | 30 | — | — | — | — |
| Sodium percarbonate[1] | 65 | 66.9 | 55 | 65 | 73[2] | 3.0 | — | 65 | 65 | 64 |
| Sodium perborate[3] | — | — | — | — | — | — | 67.6 | — | — | — |

TABLE 2-continued

| | Use (wt %) | | | | | | | | | |
|---|---|---|---|---|---|---|---|---|---|---|
| | Example | | | | | | | Comparative Example | | |
| Ingredient | 8 | 9 | 10 | 11 | 12 | 13 | 14 | 4 | 5 | 6 |
| TAED[4] | — | — | — | — | — | — | — | — | — | 1.0 |
| D2016D[5] | 0.1 | 0.5 | 0.5 | 0.5 | 0.5 | 0.5 | 0.5 | 0.5 | 0.5 | 0.5 |
| Sodium gluconate | — | 0.5 | 0.5 | 0.5 | 0.5 | 0.5 | 0.5 | 0.5 | 0.5 | 0.5 |
| Benzoic acid | 0.5 | 0.5 | 0.5 | 0.5 | 0.5 | 0.5 | 0.5 | 0.5 | 0.5 | 0.5 |
| Lauric acid | — | 0.5 | 0.1 | 0.1 | — | 0.5 | — | 0.1 | 0.1 | 0.1 |
| Myristic acid | — | 0.2 | — | — | — | 0.2 | — | — | — | — |
| Carbomer[6] | — | — | 0.7 | 0.7 | — | — | — | 0.7 | 0.7 | 0.7 |
| PEG400[7] | 32 | 25 | 36.8 | 26.8 | 19.6 | 28.9 | 25 | — | 12.9 | 26.8 |
| PEG200 | — | — | — | — | — | — | — | 26.8 | — | — |
| Ethanol (anhydrous) | — | — | — | — | — | — | — | — | 12.9 | — |
| Fluorescent whitening agent[8] | 0.3 | 0.3 | 0.3 | 0.3 | 0.3 | 0.3 | 0.3 | 0.3 | 0.3 | 0.3 |
| Enzyme[9] | 0.5 | 0.5 | 0.5 | 0.5 | 0.5 | 0.5 | 0.5 | 0.5 | 0.5 | 0.5 |
| Perfume | 0.1 | 0.1 | 0.1 | 0.1 | 0.1 | 0.1 | 0.1 | 0.1 | 0.1 | 0.1 |
| Physical Stability | | | | | | | | | | |
| Room temperature, 1 month | 2 ml | 1 ml | 1 ml | 1 ml | 1 ml | 1 ml | 2 ml | 12 ml | 15 ml | Decomposited |
| Freeze-thaw cycle (−4 to 40° C.), 1 month | 2 ml | 1 ml | 1 ml | 1 ml | 1 ml | 1 ml | 1 ml | 8 ml | 11 ml | Decomposited |
| Chemical Stability | | | | | | | | | | |
| 50° C., 1 month | 92% | 95% | 95% | 95% | 97% | 93% | 97% | 80% | 85% | 73% |

[1]sodium percarbonate, average particle size = 15 μm
[2]sodium percarbonate, average particle size = 620 μm
[3]sodium perborate, average particle size = 150 μm
[4]TAED: Mikon ATC-Green, Warwick Co.
[5]D2016D: Solutia Co.
[6]Carbomer: Carbopol 676, Noveon Co.
[7]PEG400: polyethylene glycol, molecular weight = 400
[8]AMS-GX, Ciba Specialty Co.
[9]Everlase 6.0T, Novozymes Co.

As shown in Table 2, a composition of comparative example 4 using PEG200 as a solvent shows that phase separation and a large loss of available oxygen, that means low physical and chemical stabilities compared to compositions of example 8 to example 14 using PEG 400. A composition of comparative example 5 using PEG400 and ethanol together as a solvent also has poor chemical and physical stabilities.

Compositions of example 8, example 12 and example 14 without using a thickening agent show about the same degree of physical stability as compositions of example 9 to example 11 and example 13 without using a thickening agent. Meanwhile, composition of comparative example 6 using TAED, a bleach activator, has a strong bleaching ability but poor physical and chemical stabilities.

The composition of example 12 is obtained by using a sodium percarbonate having an average particle size of 620 micrometers, and the composition of example 13 is obtained by using 3 wt % of sodium percarbonate and 60 wt % of a filler (sodium carbonate and sodium sulfate). The compositions prepared according to examples 12 and 13 show good physical and chemical stabilities. The composition of example 14 using sodium perborate as a peroxide compound also shows good physical and chemical stabilities.

Experimental Example 2

Bleaching Performance Test

Water (20° C., hardness 50 $CaCO_3$ ppm), the bleach compositions prepared as described in examples 1, 4, 8, 11 and commercial powder bleach (1 g/L) was added to cleaning performance tester (Terg-0-tometer). Ten pieces of each standard contaminated cloth (5 cm 5 cm) such as red wine (EMPA 114), coffee (wfk BC-2), pepper (wfk 10P), and tea (wfk BC-3) are cleaned for 10 minutes, rinsed with tab water for 3 minutes and dried at room temperature. The whiteness before and after cleaning of cloth was measured with colorimeter. The bleaching ability was calculated using Kubellka-Munk equation as in Equation 1. The results are shown in Table 3.

$$\text{Bleaching rate (\%)}=[(1-Rs)^2/2Rs-(1-Rb)^2/2Rb]/[(1-Rs)^2/2Rs-(1-Ro)^2/2Ro]\times 100 \quad \text{(Equation 1)}$$

In equation 1, Rs is a surface reflectivity of a contaminated cloth, Rb is a surface reflectivity of a cloth after cleaning and Ro is a surface reflectivity of a white cloth.

TABLE 3

| Classification | Example 1 | Example 4 | Example 8 | Example 11 | Commercial powder bleach |
|---|---|---|---|---|---|
| Red wine contaminated | 84% | 89% | 84% | 89% | 80% |
| Coffee contaminated | 85% | 87% | 85% | 87% | 81% |

TABLE 3-continued

| Classification | Example 1 | Example 4 | Example 8 | Example 11 | Commercial powder bleach |
|---|---|---|---|---|---|
| Pepper contaminated | 84% | 88% | 84% | 88% | 80% |
| Tea contaminated | 79% | 82% | 79% | 82% | 72% |

As shown in Table 3, the n on-aqueous liquid oxygen bleach compositions prepared as described in examples 1, 4, 8 and 11 of the present invention show equal or better bleaching ability for red wine, coffee, pepper and tea contamination compared to commercial powder bleach.

While the embodiments of the subject invention have been described and illustrated, it is obvious that various changes and modifications can be made therein without departing from the spirit of the present invention which should be limited only by the scope of the appended claims.

INDUSTRIAL APPLICABILITY

As described above, the non-aqueous liquid oxygen bleach composition of the present invention have the advantages of the liquid bleach and the powder bleach. Said advantages include a high chemical stability of no loss of available oxygen at high and low temperature during the long storage and a high physical stability of no change of viscosity and no phase separation between liquid and solid ingredients in the bleach composition.

Further, the non-aqueous liquid oxygen bleach composition of the present invention show a good bleaching ability, a high solubility in water at low temperature and does not produce dust and they can be used for a multi-purpose composition such as bleaching and removing stains in clothes and cleaning of kitchens and bathrooms.

The invention claimed is:

1. A non-aqueous liquid oxygen bleach composition comprising:

a) 59 to 85 wt % of a solid peroxygen compound, b) 10 to 38 wt % of a non-aqueous organic solvent, c) 0.1 to 5 wt % of an anionic surfactant, d) 0.1 to less than 10 wt % of total non-ionic surfactant, e) 0.1 to 85 wt % of filler, and f) 0.01 to 5 wt % of benzoic acid as a rheological stabilizer, wherein the composition in which the solid peroxygen compound is dispersed in a liquid ingredient is a suspension composition having 500 to 5,000,000 cps (25° C.) of viscosity; the composition has a chemical stability of more than 90%, wherein the loss of available oxygen from the composition comprising a)-f) is less than 10%; and wherein the weight ratio of the anionic and nonionic surfactant is 3:1 to 1:3.

2. The non-aqueous liquid oxygen bleach composition according to claim 1, wherein the composition further comprises: (a) 0.01 to 5 wt % of a thickening agent, 0.1 to 85 wt % of a filler, or (b) 0.01 to 2 wt % of a material which is a fluorescent whitening agent, an enzyme, a perfume or a mixture thereof.

3. The non-aqueous liquid oxygen bleach composition of claim 1, wherein the peroxygen compound has an average particle size in the range of from 1 to 700 micrometers.

4. The non-aqueous liquid oxygen bleach composition of claim 1, wherein the peroxygen compound is selected from the group consisting of percarbonate, perborate, persulfate, urea peroxide and a mixture thereof.

5. The non-aqueous liquid oxygen bleach composition of claim 1, wherein the non-aqueous organic solvent is selected from the group consisting of polyalkyleneglycol, polyhydricalcohol, alkyleneglycol monoalkylether, alkylester, alkylamide and a mixture thereof.

6. The non-aqueous liquid oxygen bleach composition of claim 1 or claim 5, wherein the non-aqueous organic solvent includes polyethylene glycol having 200 to 600 of molecular weight, glycerol, methyl ester, methyl amide, methyl acetate and $C_2$ to $C_3$ alkyleneglycol mono $C_2$ to $C_6$ alkylether.

7. The non-aqueous liquid oxygen bleach composition of claim 1, wherein the anionic surfactant is selected from the group consisting of linear alkylbenzene sulfonate indicated as formula 1, fatty acid salt indicated as formula 2, linear alkyl sulfonate indicated as formula 3 and alpha olefin sulfonate indicated as formula 4 and a mixture thereof:

$$R^1—C_6H_4—SO_3X; \quad \text{(Formula 1)}$$

$$R^2—CH_2—COOX; \quad \text{(Formula 2)}$$

$$R^3—CH_2—SO_3X; \text{ and} \quad \text{(Formula 3)}$$

$$R^3—CH{=}CHCH_2—SO_3X, \quad \text{(Formula 4)}$$

where $R^1$ is an alkyl chain of $C_9$ to $C_{15}$, $R^2$ is an alkyl chain of $C_{11}$ to $C_{16}$, $R^3$ is an alkyl chain of $C_{11}$ to $C_{18}$ and X is an alkaline metal.

8. The non-aqueous liquid oxygen bleach composition of claim 1, wherein the non-ionic surfactant selected from the group consisting of fatty acid alcohol polyoxyethyleneglycol indicated as formula 5, fatty acid polyoxyethyleneglycol indicated as formula 6, alkylphenyl polyoxyethyleneglycol indicated as formula 7 and a mixture thereof:

$$R^4—CH_2—(OCH_2CH_2)_n—OH, \quad \text{(Formula 5)}$$

$$R^4—CO—(OCH_2CH_2)_n—OH, \text{ and} \quad \text{(Formula 6)}$$

$$R^4—C_6H_4—(OCH_2CH_2)_n—OH, \quad \text{(Formula 7)}$$

where n is an integer of 5 to 25 and $R^4$ is an alkyl chain of $C_{11}$ to $C_{18}$.

9. The non-aqueous liquid oxygen bleach composition of claim 1, wherein the peroxygen compound stabilizer is selected from the group consisting of organic acid, salt of organic acid, amino polyphosphonate compound and a mixture thereof.

10. The non-aqueous liquid oxygen bleach composition of claim 9, wherein the organic acid is selected from the group consisting of citric acid, dipicolinic acid, gluconic acid and a mixture thereof.

11. The non-aqueous liquid oxygen bleach composition of claim 9, wherein the amino polyphosphonate compound is selected from the group consisting of hydroxy ethylene diphosphonate, ethylene diamine tetra(methylene phosphonate), diethylene triamine penta(methylene phosphonate) and amino tri(methylene phosphonate).

12. The non-aqueous oxygen bleach composition of claim 2, wherein the thickening agent is selected from the group consisting of fatty acid, cross-linked acrylic acid copolymer, colloidal silica, carboxymethylcellulose, polyvinyl alcohol, polyvinyl pyrrolidone, sodium polyacrylate and a mixture thereof.

13. The non-aqueous liquid oxygen bleach composition of claim 12, wherein the fatty acid is a mixture composed of two or more fatty acids selected from the group consisting of saturated or unsaturated $C_{10}$ to $C_{18}$ fatty acids.

14. The non-aqueous liquid oxygen bleach composition of claim 12, wherein the cross-linked acrylic acid copolymer is acrylic acid copolymer cross-linked with 0.75 to 1.5% of polyallylsucrose.

15. The non-aqueous liquid oxygen bleach composition of claim 12, wherein the colloidal silica is the hydrophilic fumed silica having 200 $m^2/g$ of surface area and an average particle size in the range of 10 to 12 nm or the hydrophobic fumed silica having 100 $m^2/g$ of surface area and an average particle size in the range of 10 to 20 nm.

16. The non-aqueous liquid oxygen bleach composition of claim 2, wherein the filler is a one or a mixture composed of ones selected from sodium carbonate ($Na_2CO_3$), sodium bicarbonate ($NaHCO_3$) and sodium sulfate ($Na_2SO_4$).

17. The non-aqueous liquid oxygen bleach composition of claim 4, wherein the peroxygen compound is selected from the group consisting of percarbonate, perborate and a mixture thereof and the non-aqueous organic solvent is a polyalkyleneglycol.

18. The non-aqueous liquid oxygen bleach composition of claim 17, wherein the polyalkyleneglycol is PEG 400.

* * * * *